US007275108B2

United States Patent
Sakata

(10) Patent No.: US 7,275,108 B2
(45) Date of Patent: Sep. 25, 2007

(54) COMMUNICATION SYSTEM AND METHOD FOR USING ANY COMMUNICATION NETWORK THEREWITH

(75) Inventor: Masayuki Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 667 days.

(21) Appl. No.: 09/987,517

(22) Filed: Nov. 15, 2001

(65) Prior Publication Data

US 2002/0069287 A1 Jun. 6, 2002

(30) Foreign Application Priority Data

Dec. 6, 2000 (JP) .............................. 2000/370841

(51) Int. Cl.
*G06F 15/16* (2006.01)

(52) U.S. Cl. .................. 709/229; 709/230; 370/238; 370/329; 370/356

(58) Field of Classification Search ................. 709/230
See application file for complete search history.

(56) References Cited

U.S. PATENT DOCUMENTS

| 6,157,636 | A  | * | 12/2000 | Voit et al. ..................... 370/353 |
| 6,400,722 | B1 | * | 6/2002  | Chuah et al. .................. 370/401 |
| 6,554,184 | B1 | * | 4/2003  | Amos .......................... 235/379 |
| 6,769,000 | B1 | * | 7/2004  | Akhtar et al. ............. 707/103 R |
| 7,075,908 | B2 | * | 7/2006  | Noguchi et al. ............. 370/329 |

FOREIGN PATENT DOCUMENTS

| JP | H11-75245 A   | 3/1999  |
| JP | 2000-278756 A | 10/2000 |
| JP | 2002-164887 A | 6/2002  |

* cited by examiner

*Primary Examiner*—Yves Dalencourt
(74) *Attorney, Agent, or Firm*—Sughrue Mion, PLLC

(57) ABSTRACT

A communication system is provided that allows the same mobile terminal to be used to perform communication even if a network other than a mobile communication network is used and allows to the communication to be maintained across networks, and is capable of collectively managing charges for the networks.

An information service network comprises a Mobile IP HA device, an AAAH device for managing and authenticating a mobile terminal and receiving accounting information, a VOIP device for converting voice data transferred to and from the Internet into real voice, and a service device, which may be any application server. Various networks, such as a public telephone network, mobile communication network, private IP network, and supermarket/convenience store network, have an FA device for registering the position of the mobile terminal with the HA device and an AAAL device for exchanging authentication and accounting information with the AAAH device.

14 Claims, 8 Drawing Sheets

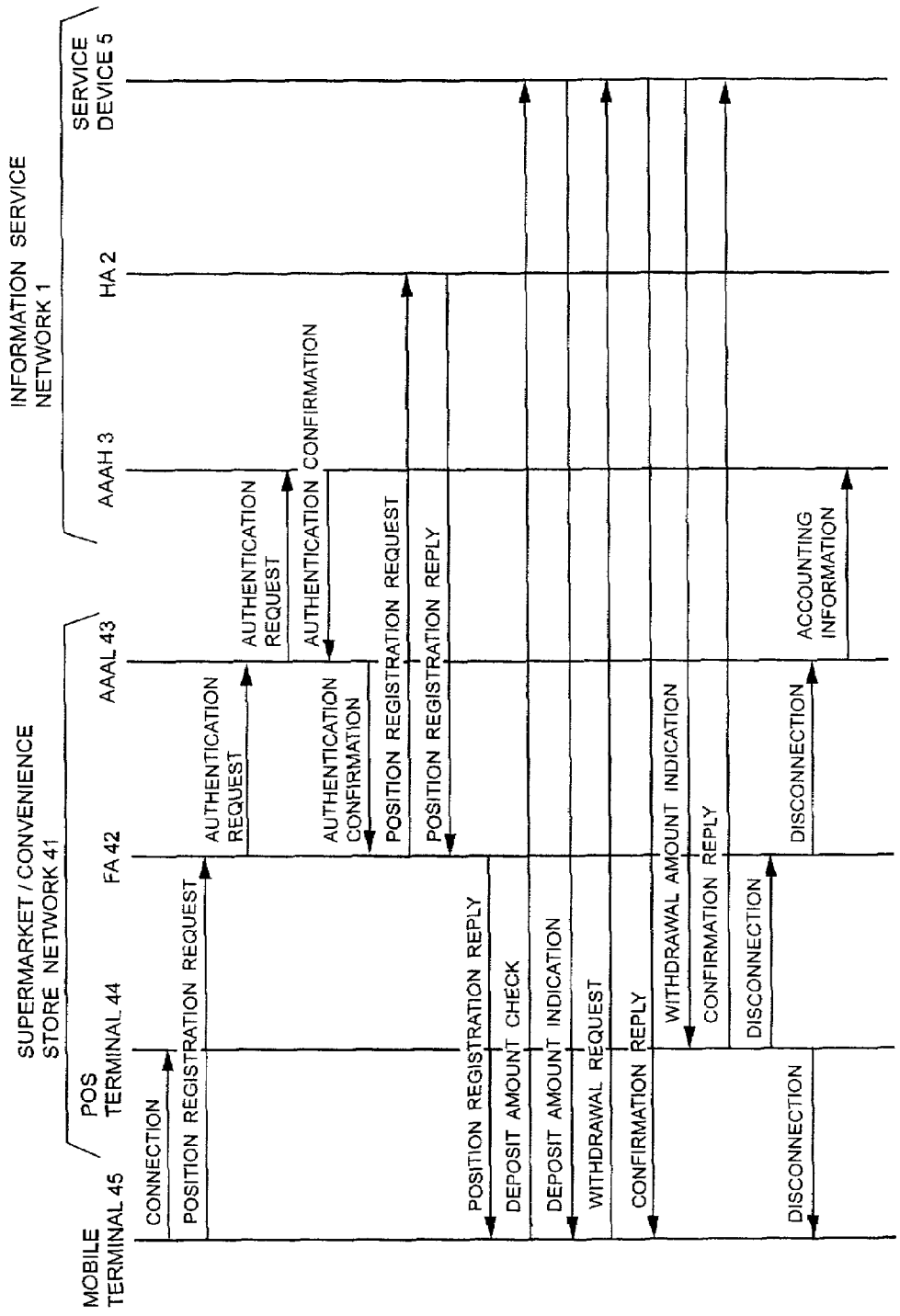

COMMUNICATION SYSTEM AND METHOD FOR USING ANY COMMUNICATION NETWORK THEREWITH

BACKGROUND OF THE INVENTION

1. Field of the Invention

The present invention relates to a communication system and a method for using a communication network therewith, and in particular, to a method for using any of communication systems, such as a mobile communication network, public telephone network, and private network, that use different communication technologies.

2. Description of the Related Art

Today communication networks, such as a mobile communication network, public telephone network, and private network, can be connected to the Internet by using the IP (Internet Protocol) and allows data to be sent and received to and from each other over the Internet.

A public telephone network is a telephone network that uses cables and has switches connected to telephones at individual homes and companies. A mobile terminal can be connected to the telephone by using wireless communications, such as Bluetooth and IrDA (Infrared Data Association), or cable communications.

The public telephone network is called PSTN (Public Switched Telephone Network). ISDNs (Integrated Services Digital Networks) also fall into this category. The telephone may be a public telephone.

A mobile communication network is a network that uses base stations to wirelessly accommodate mobile terminals. PDC (Personal Digital Cellular), CDMA (Code Division Multiple Access), PHS (Personal Handyphone System) fall into this category.

A private IP network is a network constructed by using the IP, called intranet, and used as LANs (Local Area Networks) in companies and SOHOs (Small Office Home Offices). Mobile terminals can be connected to an adapter in the private IP network by wireless or using cables to perform the same operations as those of a host terminal residing in the private IP network.

However, in the mobile communication system using the conventional mobile communication network, a mobile terminal can move only within the mobile communication network. Therefore another terminal must be used when a public telephone network or other networks are used.

If a network other than the mobile communication network is used through the mobile terminal, charges for both networks must be paid separately because each of the networks uses an independent charge accounting system.

SUMMARY OF THE INVENTION

It is an object of the present invention to solve the above-mentioned problem by providing a communication system and a method for using a communication network therewith that allow the same mobile terminal to be used to perform communication even if a network other than a mobile communication network is used and allows to the communication to be maintained across networks.

It is another object of the present invention to provide a communication system and a method used therewith that are capable of collectively managing charges for individual networks.

A communication system according to the present invention is a communication system to which a mobile terminal can be connected and comprises a plurality of communication networks using different communication technologies, each of the plurality of communication networks uses the Internet Protocol to connect to the Internet, the communication system comprising: an information service network for managing accounting information about the mobile terminal and providing services; a Mobile IP (Internet Protocol) HA (Home Agent) device provided in the information service network for constantly managing which network the mobile terminal exists in and delivering received data to an appropriate network over the Internet; and an FA (Foreign Agent) device provided in each of the plurality of communication networks for sending a position registration request from the mobile terminal to the HA device and transferring data delivered from the HA device over the Internet to the mobile terminal when the mobile terminal is under the coverage of the FA device; wherein the position registration request and a reply corresponding to the position registration request communicated between the HA device and FA device are used to flexibly enable communications between the plurality of communication networks and the continuation of the communications across the plurality of communication networks.

Another communication system according to the present invention comprises, in addition to the above-mentioned components, an AAAL (Authentication, Authorization and Accounting Local) device provided in each of the plurality of communication networks for sending charge information about the network in which the AAAL device is provided over the Internet; and an AAAH (Authentication, Authorization and Accounting Home) device provided in the information service network for managing accounting information about the mobile terminal according to the charge information sent from the AAAL device over the Internet.

According to the present invention, there is provided a method for using a communication network in a communication system which a mobile terminal can be connected to and comprises a plurality of communication networks using different communication technologies, each of the plurality of communication networks use the Internet Protocol to connect to the Internet, the method comprising: providing in an information service network for managing accounting information about the mobile terminal and providing services a Mobile IP (Internet Protocol) HA (Home Agent) device for constantly managing which network the mobile terminal exist in and delivering received data to an appropriate network over the Internet; and providing in each of the plurality of communication networks an FA (Foreign Agent) device the Mobile IP, for sending a position registration request from the mobile terminal to the HA device and transferring data delivered from the HA device over the Internet to the mobile terminal when the mobile terminal is under the coverage of the device; wherein the position registration request and a reply corresponding to the position registration request communicated between the HA device and FA device are used to flexibly enable communications between the plurality of communication networks and the continuation of the communications across the plurality of communication networks.

An method for using a communication network in another communication system according to the present invention provides in each of the plurality of communication networks an AAAL (Authentication, Authorization and Accounting Local) device for sending charge information about the network in which the AAAL device is provided over the Internet, and providing an AAAH (Authentication, Authorization and Accounting Home) device in the information service network for managing accounting information about the mobile terminal according to the charge information sent from the AAAL device over the Internet.

Thus, the mobile communication system according to the present invention is characterized in that a mobile phone terminal can be used in a communication system that can be connected to any of communication networks such as a mobile communication network, public telephone network, and private network without changing settings on the mobile phone terminal.

The mobile communication system according to the present invention provides the function of a Mobile IP FA (foreign agent) connected to the Internet to a network such as a mobile communication network, public telephone network, and private network so that, when a mobile terminal such as a mobile phone terminal is under the coverage of the network, a position registration request is sent to a device that has the function of Mobile IP HA (Home Agent) in an information service network and the HA function constantly manages the mobile terminal to identify an FA in a network where the mobile terminal exists, thereby allowing received data to be delivered to an appropriate network.

Thus, according to the present invention, whichever network the mobile terminal moves into, the position of the mobile terminal is registered with the HA of the information network from the FA in that network, thereby allowing the mobile terminal to use services under the coverage of the network and continue to perform communications when moving from another network without changing settings on the mobile terminal.

Also, the present invention provides the function of indicating a charge for each network from an AAAL (Authentication, Authorization and Accounting Local) of the network to an AAAH (Authentication, Authorization and Accounting Home) of the information service network, therefore the user can uses networks varying in charge without changing settings on the mobile terminal.

BRIEF DESCRIPTION OF THE DRAWINGS

FIG. 8 is a sequence chart of an operation of the communication system according to another embodiment of the present invention.

DETAILED DESCRIPTION OF EXEMPLARY EMBODIMENTS

Figure 1:
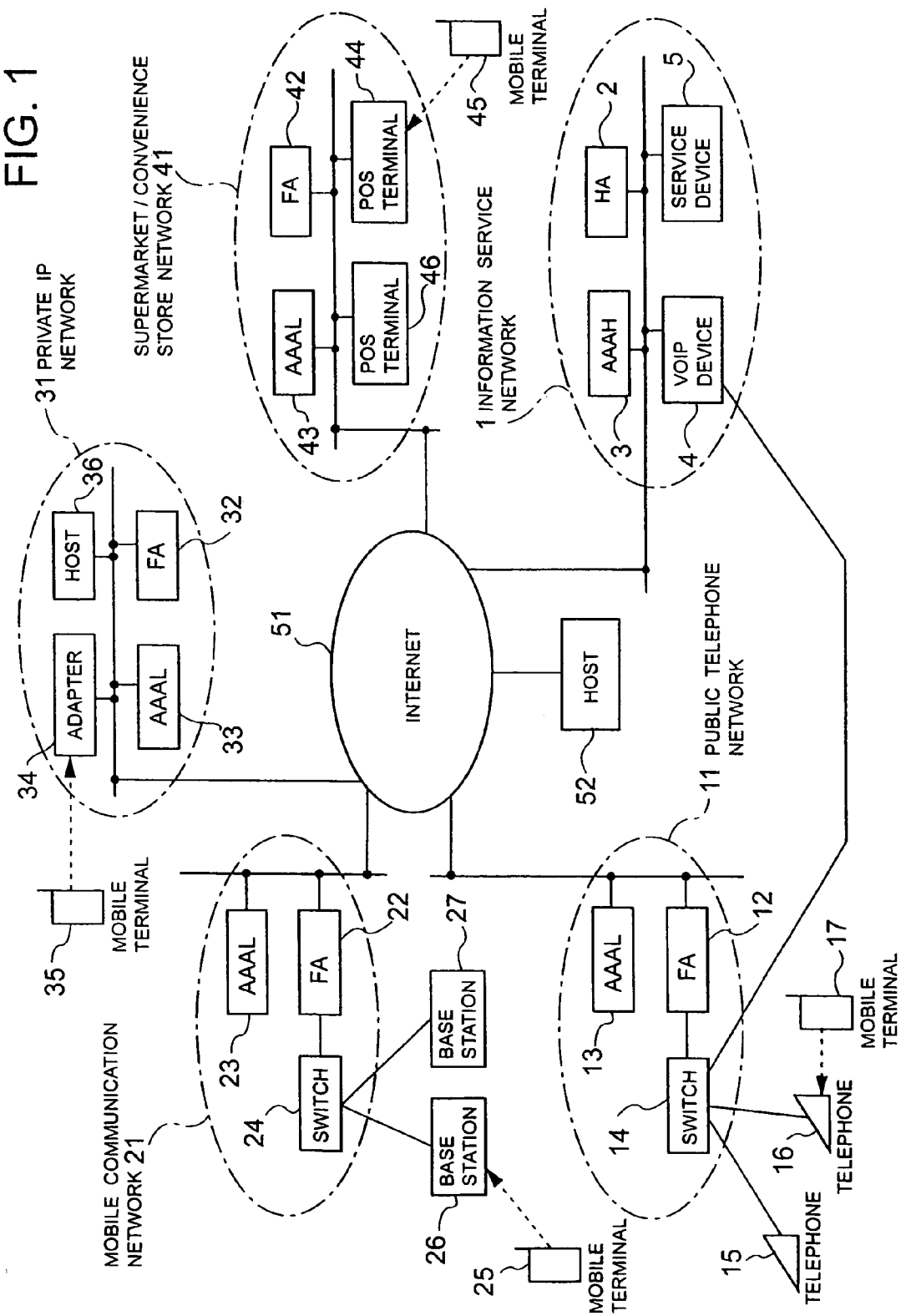
FIG. 1 is a block diagram of a communication system according to an embodiment of the present invention.

An embodiment of the present invention will be described below with reference to the drawings. FIG. 1 is a block diagram of a configuration of a communication system according to one embodiment of the present invention. The communication system according to the embodiment of the present invention in FIG. 1 comprises an information service network 1, public telephone network 11, mobile communication network 21, private IP (Internet Protocol) network 31, and supermarket/convenience store network 41, each of which is connected to the Internet 51.

The information service network 1 is a network operated by a company managing accounting information and providing services and is connected to the Internet 51 by using IP. The information service network 1 comprises a Mobile IP HA (Home Agent) device 2, an AAAH (Authentication, Authorization and Accounting Home) device 3, a VOIP (Voice over IP) device 4 capable of identifying a network into which a mobile terminal moved, performing authentication, and receiving accounting information, and a service device 5. Mobile IP herein is based on RFC2002, which is an standard of IP.

The VoIP device 4 uses VoIP to converts voice data transmitted over the Internet 51 into real voice to connect to the public telephone network 11 and can also directly connect to the mobile communication network 21.

Any application servers such as a mail server, WWW (World Wide Web) server, WAP (Wireless Application Protocol) server dedicated to mobile terminals can be provided as the service device 5. A private IP network such as an intranet may be used instead of the Internet 51.

Networks, such as the public telephone network 11, mobile communication network 21, private IP network 31, and supermarket/convenience store network 41, other than the information service network 1 are connected to the Internet 51 by using IP.

The networks, including the public telephone network 11, mobile communication network 21, private IP network 31, and supermarket/convenience store network 41, have Mobile IP FA (Foreign Agent) devices 12, 22, 32, 42, which, when recognizing that mobile terminals 17, 25, 35, 45 are under the coverage of their networks, register the positions of the mobile terminals with the HA device 2 in the information service network 1 that manages locations into which they are moved and AAAL (Authentication, Authorization and Accounting Local) devices 13, 23, 33, 43, capable of performing authentication in cooperation with the AAAH device 3 in the information service network land indicating accounting information to the AAAH device 3.

The public telephone network 11 is a wired telephone network connected to telephones 15, 16 in individual homes and companies through a switch 14. The telephone 16 can be connected with a mobile terminal 17 by wireless communications such as Bluetooth or IrDa (Infrared Data Association),or by cables. The telephones 15, 16 may be public telephones.

The public telephone network 11 is called PSTN (Public Switched Telephone network). ISDNs (Integrated Services Digital Networks) also fall into this category.

The switch 14 is connected to the VOIP device 4 in the information service network 1 for sending and receiving voice data without changing the data. The Internet 51 is used from within the public telephone network 11 when packet data communication is performed or when voice communication is performed by converting voice data into data packets that can be transmitted over the Internet 51 by the conversion function provided in the switch 14 or the mobile terminal 17. In this case, the switch 14 sends and receives the packet data to and from the FA device 12.

The mobile communication network 21 is a network that uses base stations 26, 27 to accommodate the mobile terminal 25 by wireless and may be a PDC(Personal Digital Cellular), CDMA (Code Division Multiple Access), or PHS (Personal Handyphone System) network. A switch 24 and the base stations 26, 27 in the mobile communication network 21 are shown by way of example only and the configuration of the network is not limited to this example.

The Internet 51 is used from within the public communication network 21 when packet data communication is performed or when voice communication is performed by converting voice data into data packets that can be transmitted over the Internet 51 by the conversion function provided in the switch 24 or the mobile terminal 25. In this case, the switch 24 sends and receives the packet data to and from the FA device 22.

The private IP network 31 is constructed by using IP, is called intranet, and is used as networks such as a LAN (Local Area Network) in companies and a SOHO (Small Office Home Office).

The mobile terminal 35 is connected to an adapter 34 in the private IP network 31 by wireless or cables and is capable of performing the same operations as those of the host terminal 36 in the private IP network 31. If voice communication is performed, the adapter 34 or the mobile terminal 35 has the function of converting voice data into data packets that can be transmitted over the Internet 51 and the adapter 34 sends and receives packet data to and from the FA device 32.

The supermarket/convenience store network 41 is a kind of private IP network in which POS (Point Of Sales) terminals 44, 46 provided in each of stores are connected to the mobile terminal 45 by wireless or cables.

The configuration of the supermarket/convenience store network 41 will be the same as that of the private IP network 31 described above if the POS terminal 44 is replaced with the adapter 34 and the mobile terminal 45 is replaced with the mobile terminal 35.

A host terminal 52 is connected to the Internet 51 and performs packet data communication with the mobile terminals 17, 25, 35, 45.

Communication performed when a mobile terminal is under the coverage of the mobile communications network 21 and exists as the mobile terminal 25 in the network configuration according to an embodiment of the present invention will be described below with reference to FIG. 1.

The mobile terminal 25 is connected to the mobile communication network 21 through a wireless connection and base stations 26, 27 by the switch 24. The switch 24 is connected to the FA device 22 having the function of indicating that the mobile terminal 25 exists within the mobile communication network 21 to the HA device 2 of the information service network 1 over the Internet 51. The AAAL device 23 has the function of authenticating that the mobile terminal 25 can be used within the mobile communication network 21 and indicating accounting information in the mobile communication network 21 to the AAAH device 3 in the information service network 1.

The VOIP device 4 in the information service network 1 is connected to the Internet 51 and the public telephone network 11 and has the function of converting an audio packet contained in a packet received from the Internet 51 into real voice data to send it to the public telephone network 11, and vice versa.

FIGS. 2 to 7 is sequence charts illustrating the operations of the communication system according to an embodiment of the present invention. The operations of the communication system according to the embodiment of the present invention will be described below with reference to FIGS. 1 to 8.

Figure 2:
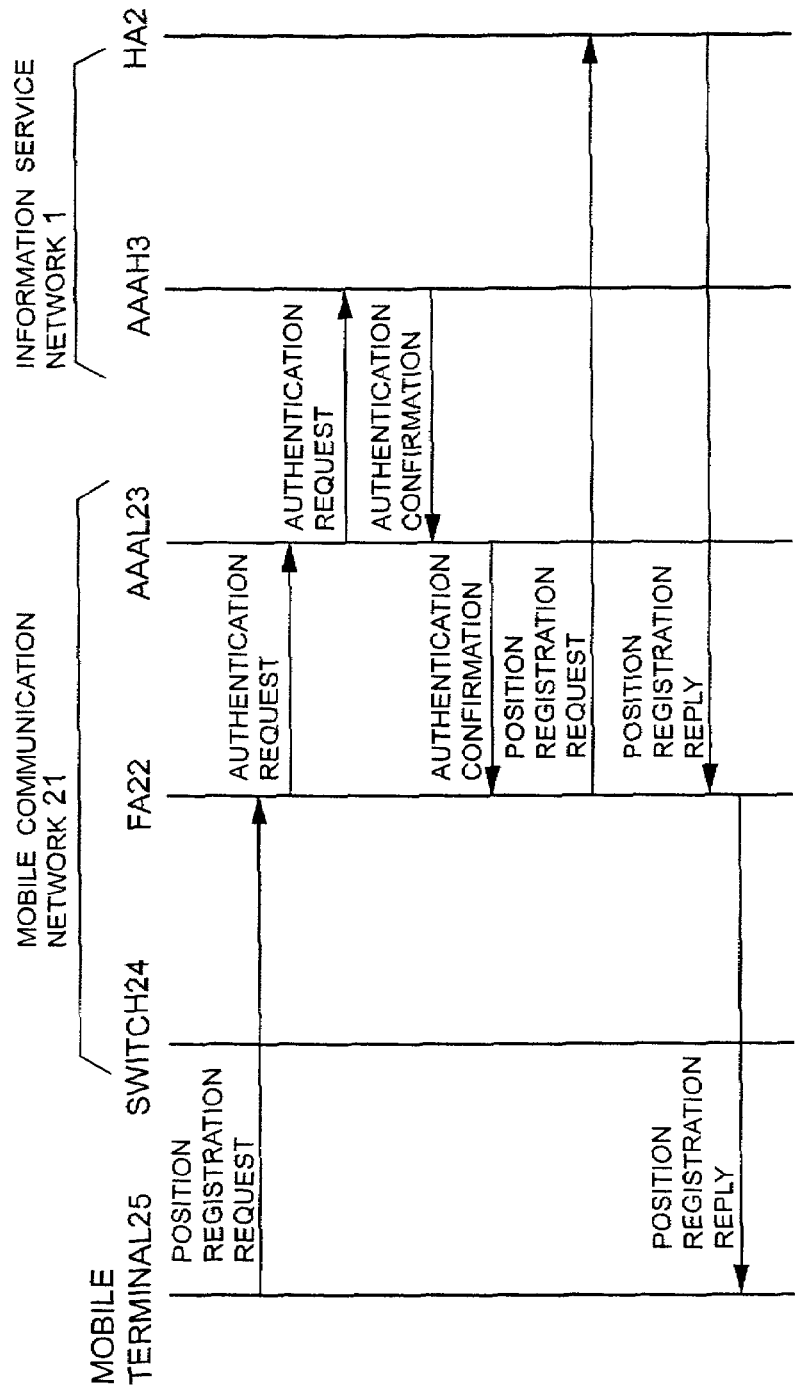
FIG. 2 is a sequence chart of an operation of the communication system according to the embodiment of the present invention.

Referring to FIG. 2, a sequence for performing position registration is shown. First, the mobile terminal 25 sends a position registration request to the FA device 22. The FA device 22 sends an authentication request to the AAAL device 23 in the mobile communication network 21.

The AAAL device 23 verifies authentication information about the mobile terminal 25. More specifically, it determines whether the mobile terminal 25 is registered in the mobile communication network 21 so that it can be used within the network 21. If the AAAL device 23 determines that the mobile terminal 25 is registered, the AAAL device 23 sends a authentication request to the AAAH device 3 in the information service network 1.

The AAAH device 3 verifies authentication information about the mobile terminal 25. More specifically, it determines whether the mobile terminal 25 is registered in the information service network 1. If the AAAH device 3 determines that the mobile terminal 25 is registered, the AAAH device 3 sends an authentication confirmation to the AAAL device 23. The AAAL device 23 sends the authentication confirmation to the FA device 22.

When the FA device 22 receives the authentication confirmation, it sends a position registration request to the HA device 2 in the information service network 1. The HA device 2 recognizes that the mobile terminal 25 is under the coverage of the FA device 22 and sends a position registration reply to the FA device 22. The FA device 22 sends the position registration reply to the mobile terminal 25, then the position registration sequence ends.

Figure 3:
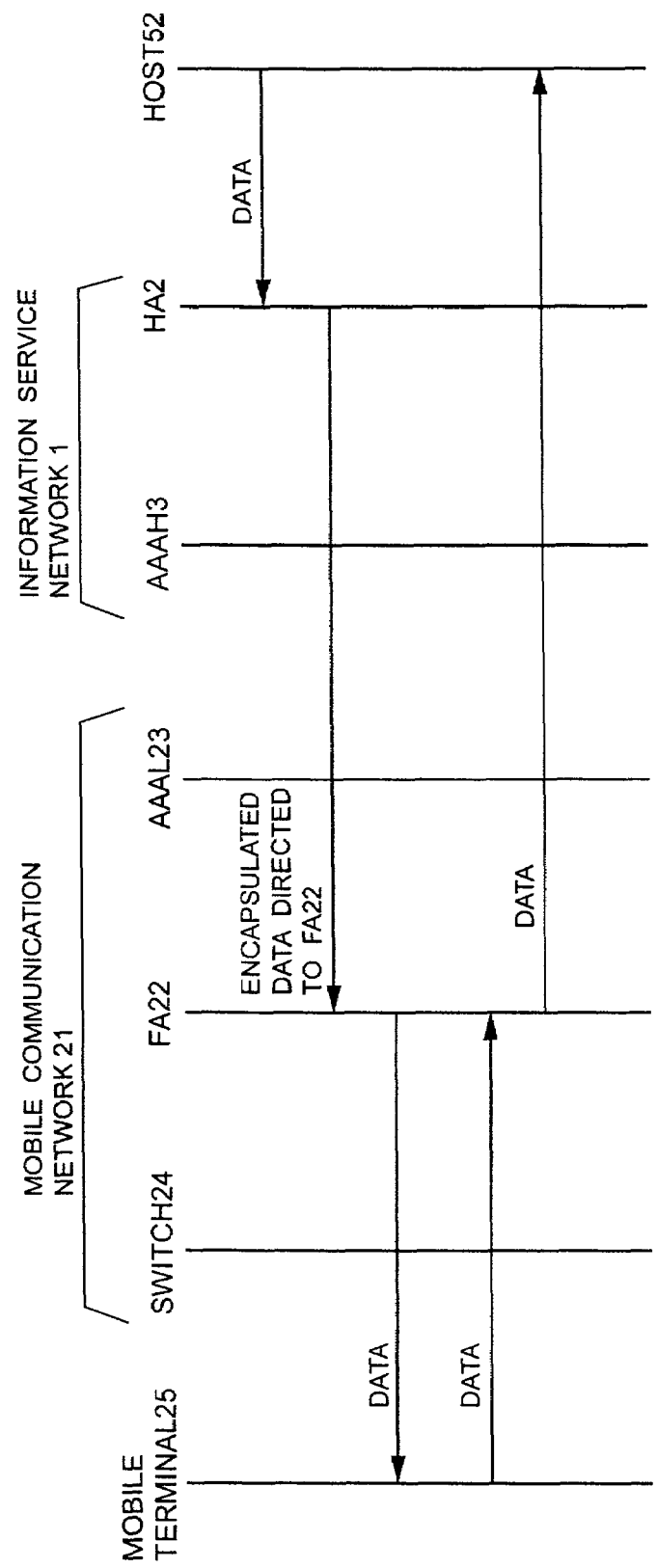
FIG. 3 is a sequence chart of an operation of the communication system according to the embodiment of the present invention.

Communication between the host terminal 52 and the mobile terminal 25 will be considered below with reference to FIG. 3. A Mobile IP procedure will be described here in accordance with RFC2002, which is a standard Internet material.

For the host terminal 52 to send data to the mobile terminal 25, first the HA device 2 captures the data. The HA device 2 encapsulates and sends the packet to the address of the FA device 22. The FA device 22 extracts the encapsulated data and sends it to the switch 24 under the control of the FA device 22. Then the data reaches the mobile terminal 25 by using wireless communication.

On the other hand, when the mobile terminal 25 sends data to the host terminal 52, the data is sent from the switch 24 to the FA device 22 by wireless. The FA device 22 sends the data to the Internet 51 without making any change to the data. Then the data reaches the host terminal 52.

Figure 4:
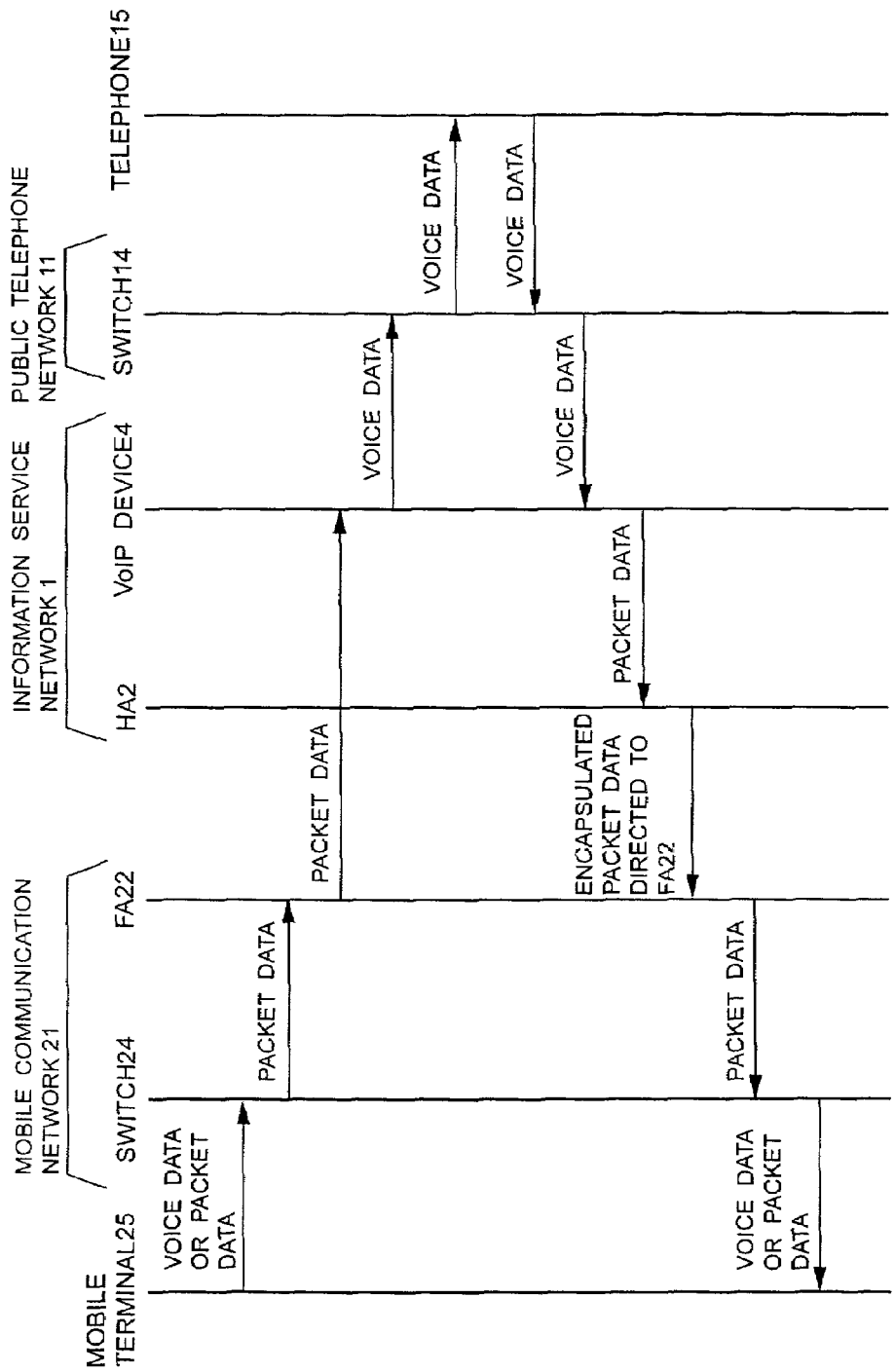
FIG. 4 is a sequence chart of an operation of the communication system according to the embodiment of the present invention.

Voice communication between the mobile terminal 25 and a telephone 15 connected to the public telephone network 11 will considered below with reference to FIG. 4. The mobile terminal 25 converts voice data into packet data and sends it to the switch 24 in the mobile communication network 21, or the mobile terminal 25 sends the voice data to the mobile communication network 21 without converting it and the voice data is converted into packet data in the switch 24.

The destination of the packet data is the VOIP device 4 in the information service network 1. Therefore, the packet data is sent from the switch 24 to the VOIP device 4 through the FA device 22.

The VOIP device 4 has the function of converting packet data sent to it into voice data. The voice data is provided to the switch 14 in the public telephone network 11 over a line connected to the public telephone network 11 and then sent to the telephone 15 by following a procedure in the public telephone network 11.

Inversely, voice data sent from the telephone 15 is sent to the VOIP device 4 in the information service network 1 through the switch 14 in the public telephone network 11. The VoIP device 4 converts the voice data into packet data and directs the packet data to the mobile terminal 25. The packet data directed to the mobile terminal 25 is captured by the HA device 2 according to a Mobile IP procedure and sent to the FA device 22.

The FA device 22 extracts the packet data and sends it to the switch 24. Then the data is provided to the mobile terminal 25 by wireless. The packet data is converted into voice data by the switch 24 or the mobile terminal 25, enabling voice conversation. Communication with the mobile terminal 25 in the mobile communication network 21 can also be performed through a similar procedure.

Figure 5:
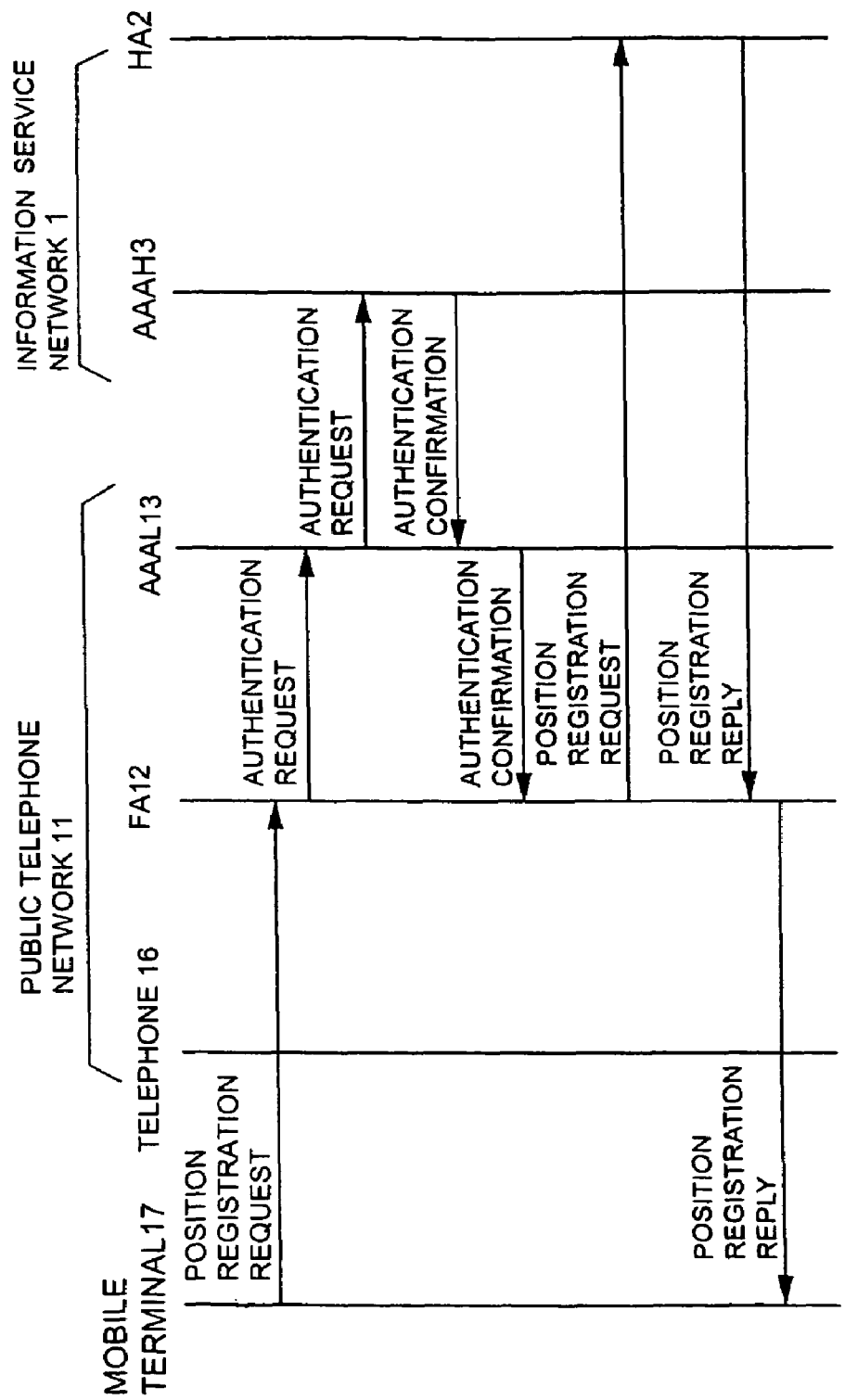
FIG. 5 is a sequence chart of an operation of the communication system according to the embodiment of the present invention.

Communication performed when the mobile terminal is in position of the mobile terminal 17 and is connected by wireless or cables to a telephone connected to the public telephone network. Referring to FIG. 5, a sequence for performing position registration is shown.

First, the mobile terminal 17 is connected to the telephone 16 by wireless or a cable and sends a position registration request to the FA device 12. The FA device 12 sends an authentication request to AAAL device 13 in the public telephone network 11. The AAAL device 13 verifies authentication information about the mobile terminal 17. If it is authorized, the AAAL device 13 sends the authentication request to the AAAH device 3 in the information service network 1.

The AAAH device 3 verifies the authentication information about the mobile terminal 17. If it is authorized, the AAAH device 3 sends an authentication confirmation to the AAAL device 13. The AAAL device 13 sends the authentication confirmation to the FA device 12. When the FA device 12 receives the authentication confirmation, it sends a position registration request to the HA device 2 in the information service network 1. The HA device 2 recognizes that the mobile terminal 17 is under the coverage of the FA device 12 and sends a position registration reply to the FA device 12. The FA device 12 sends the position registration reply to the mobile terminal 17. Then the position registration sequence ends.

Packet communication and voice communication can be performed also in the public telephone network 11 by following the same procedure as that in the mobile communication network 21 described above. In addition, by performing position defined by Mobile IP quickly, a mobile phone in the mobile communication network 21 can be connected to the telephone 16 connected to the public telephone network 11 while maintaining communication, and vice versa, and the most inexpensive network can be automatically selected from networks currently available to the mobile terminal 17 to connect the mobile terminal 17 to the selected network.

More specifically, one can use a mobile phone over the mobile communication network 21 on his way home, then, at the instant when the mobile phone detects the phone 16 connected to the public telephone network 11, the connection is switched to the telephone 16, thereby automatically allowing the less expensive network to be used.

Figure 6:
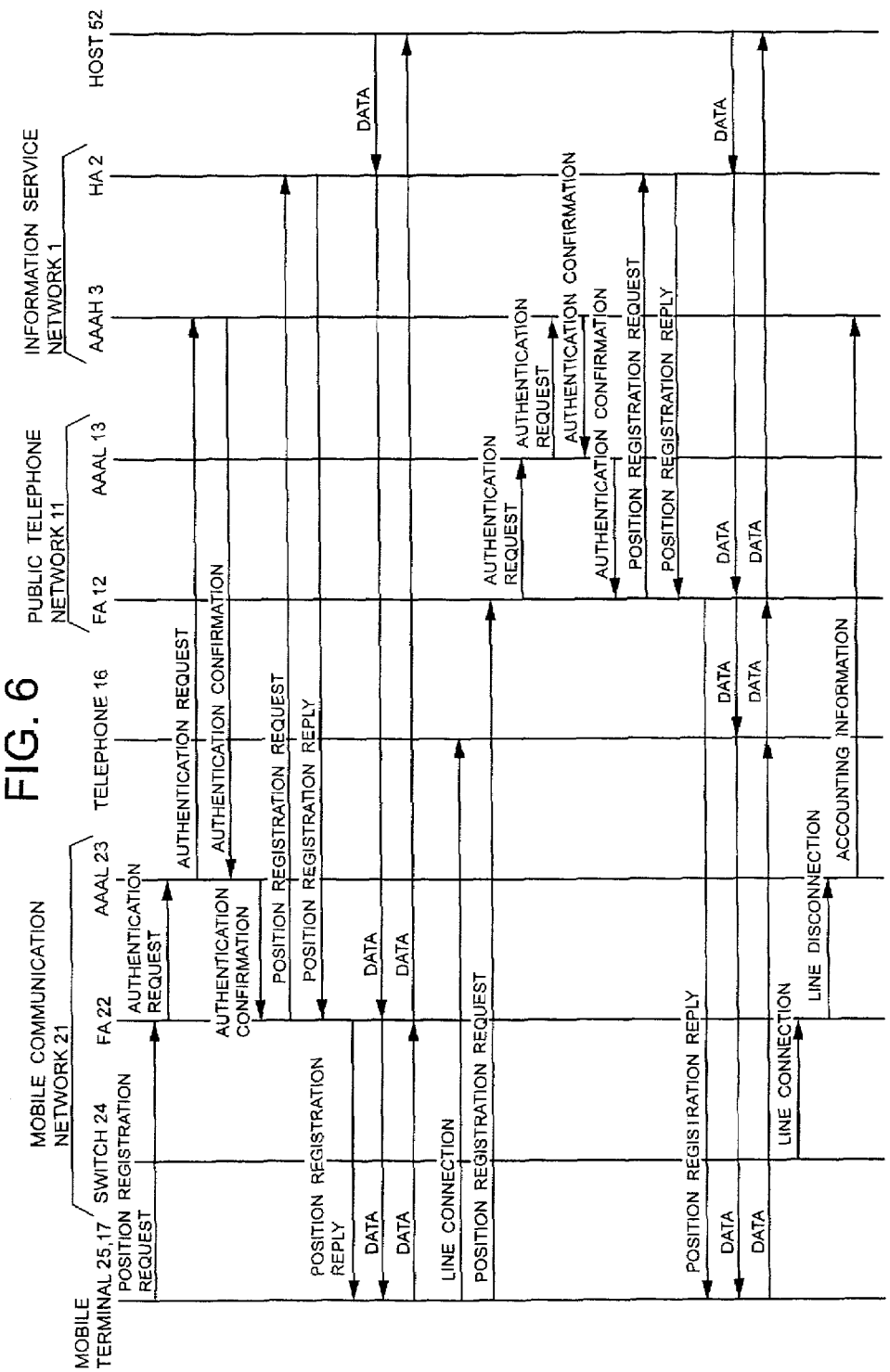
FIG. 6 is a sequence chart of an operation of the communication system according to the embodiment of the present invention.

This sequence will be described below with reference to FIG. 6. While packet communication with the host terminal 52 is used here as an example, the same sequence is the same for voice communication. The sequence for sending a position registration request to the HA device 2 from the mobile communication network 21 is the same as that in FIG. 2.

When the mobile terminal 25 detects the telephone 16 connected to the public telephone network 11, the mobile terminal 25 is position-registered with the HA device 2 as the mobile terminal 17 through the same sequence as that shown in FIG. 5. After the completion of the position registration, the HA device 2 changes the destination of data that has been being sent to the FA device 22 to the FA device 12 to continue the communication.

When the switch 24 detects that the mobile terminal 25 is no longer exists within the mobile communication network 21, sends a disconnection request to the FA device 22. The FA device 22 sends the disconnection request to the AAAL device 23. Then the AAAL device 23 sends, in addition to the disconnection information, accounting information to the AAAH device 3 and the mobile terminal 25 is released from the mobile communication network 21.

Figure 7:
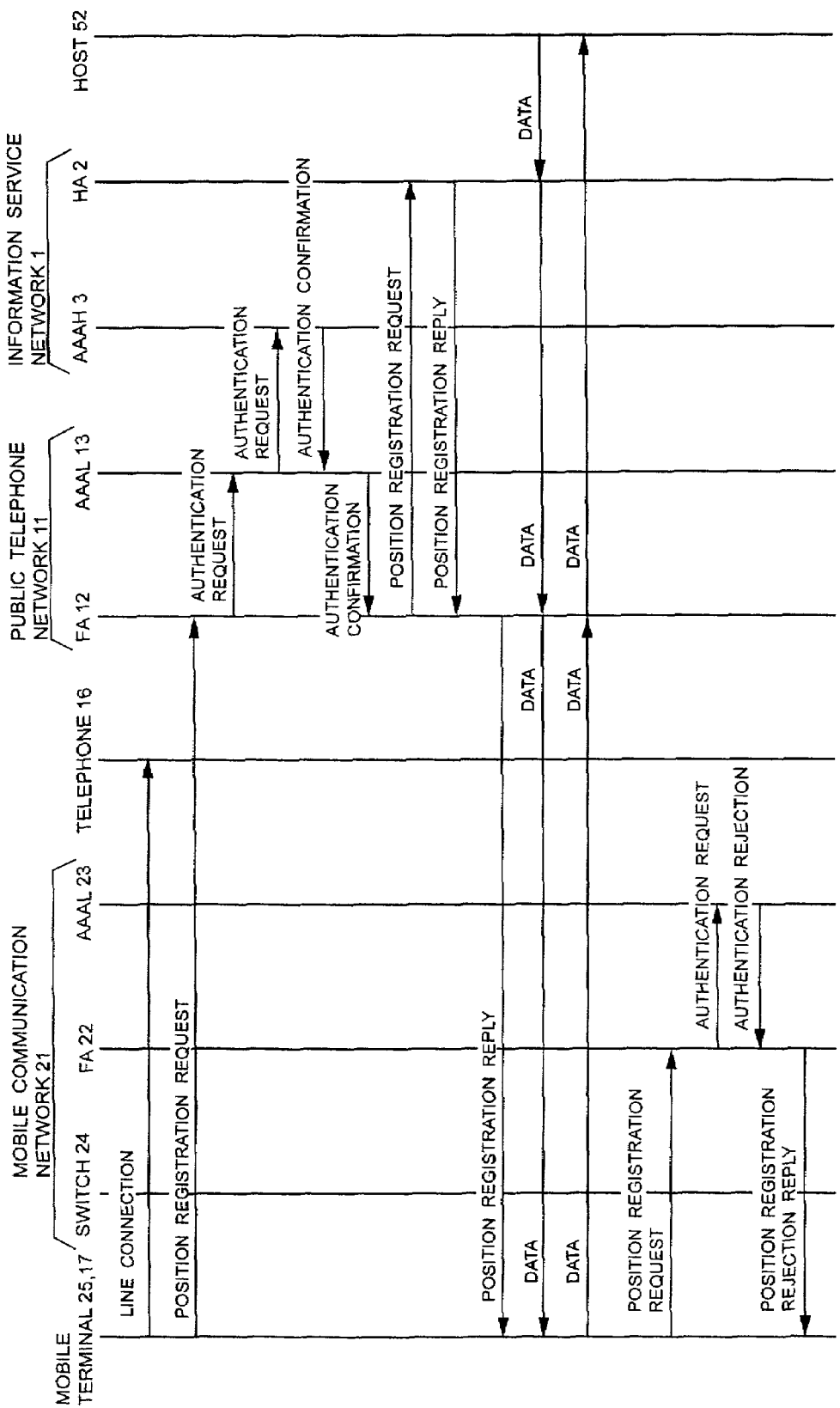
FIG. 7 is a sequence chart of an operation of the communication system according to the embodiment of the present invention.

A method in which connection is not changed to a newly detected network if its communication charge is higher than that for the present network is shown in FIG. 7. FIG. 7 shows an operation performed when a terminal detects that it enters the coverage of the mobile communication network 21 while communicating over the public telephone network 11 and the communication charge for the mobile communication network 21 is higher than that for the public telephone network 11. The method for performing position registration by using the public telephone network 11 is the same as the sequence shown in FIG. 5.

When the terminal detects that it is in the mobile communication network 21, it sends a position registration request to the FA device 22 as a mobile terminal 25. The position registration request contains the current communication charge information, for example information indicating that the charge is 10 yen per minute. This communication charge information is contained in an authentication request sent from the FA device 22 to the AAAL device 23.

If the AAAL device 23 determines that the charge for the mobile communication network 21 is higher, it returns an authentication rejection to the FA device 22 without sending the authentication request to the AAAL device 3. The FA device 22 sends position registration rejection information to the mobile terminal 25 to continue communicating over the public telephone network 11. If the mobile terminal 17 leaves the public telephone network 11, it immediately detects a new mobile communication network 21 and performs position registration regardless of its communication charge information, thereby enabling the communication over the public telephone network 11 to be passed over to the mobile communication network 21.

The above-described procedure is followed also in a case where the mobile terminal moves into the coverage of the private IP network 31. The mobile terminal 35 connected to the private IP network 31 through the adapter 34 uses the FA device 32 and AAAL device 33 to be authenticated in the AAAH device 3 and can perform packet data communication and voice communication by using the HA device 2.

As described above, each of the public telephone network 11, mobile communication network 21, private IP network 31, and supermarket/convenience store network 41 has the Mobile IP FA function and therefore the mobile terminals 17, 25, 35, 45 can performs communication whichever network it moves into and can continue to communicate when changing from one network to another.

In addition, the public telephone network 11, mobile communication network 21, private IP network 31, and supermarket/convenience store network 41 can indicate its charge to each other, therefore a user can use the networks even if there are differences in charge between them.

Furthermore, if there are difference in charge between the public telephone network 11, mobile communication network 21, private IP network 31, and supermarket/convenience store network 41, the mobile terminals 17, 25, 35, 45 can automatically select a less expensive network.

FIG. 8 is a sequence chart of a communication system according to another embodiment of the present invention. While the basic configuration of the communication system according to this alternative embodiment of the present invention is the same as that of the communication system according to the embodiment of the present invention shown in FIG. 1, the function of indicating accounting information is used to extend the scope of the application of the system. Operations of the communication system according to the alternative embodiment of the present invention will be described below with reference to FIG. 8.

A supermarket/convenience store network 41 includes an FA device 42, an AAAL device 43, and a plurality of POS terminals 44, 46. A mobile terminal 45 can be connected to the POS terminals 44, 46 by wireless or cable.

The supermarket/convenience store network 41 of course allows for packet communication and voice communication through a position registration request sent to the HA device 2 as described above with respect to the other networks, and in addition, may have the function of making bank withdrawals through the operation of the POS terminals 44, 46.

A position registration request is sent from the mobile terminal 45. The FA device 42 and AAAL device 43 are used to perform position registration in the HA device 2. An information service network 1 is connected to the network of a bank (not shown), or the information service network 1 itself is the network of the bank. It is assumed in this embodiment that the information service network 1 itself is the bank network and account numbers and deposit information are stored in a service device 5.

The mobile terminal 45 is operated and an account number and personal identification number are used to obtain deposit information from the service device 5. Then the mobile terminal 45 is operated to indicate an amount to be withdrawn to the service device 5. If the service device 5 authenticates the numbers, the service device 5 sends a response to the mobile terminal 45 and indicates the amount to be withdrawn to the POS terminals 44, 46.

The POS terminals 44, 46 may be machines that can be operated by a salesclerk at a supermarket/convenience store, or may be machines that automatically operates. Money is paid in accordance with the deposit withdrawal information provided to the POS terminals 44,46. Then connections from the POS terminals 44, 46 to the FA device 42 and mobile terminal 45 are disconnected. When disconnecting from the FA device 42, the amount withdrawn plus a service charge is indicated as accounting information to the FA device 42. The FA device 42 provides the accounting information to an AAAL device 43 on disconnection from the AAAL device 43. The AAAL device 43 provides the accounting information to an AAAH device 3.

Thus, according to this embodiment of the present invention, the accounting information is used as the withdrawal information to enable the withdrawal through the POS terminals 44, 46 at a supermarket or convenience store.

As described above, a communication system according to the present invention comprises a plurality of communication networks which mobile terminals can be connected to and use different communication technologies, each of the plurality of communication networks uses the Internet Protocol to connect to the Internet, wherein: a Mobile IP HA device is provided in an information service network managing accounting information about the mobile terminal and providing services, the Mobile IP HA device constantly managing which network the mobile terminal exists in and delivering received data to an appropriate network over the Internet; a Mobile IP FA device is provided in each of the plurality of the communication networks, the Mobile IP FA device sending a position registration request from the mobile terminal to the HA device and transfers data delivered from the HA device over the Internet to the mobile terminal when the mobile terminal is under the coverage of the FA device; and the position registration request and a replay to the request communicated between the HA device and the FA device flexibly enable communications between the plurality of communication networks and the continuation of the communications across the plurality of communication networks. Thus, the communication system has the advantage that the same mobile terminal can be used to perform communication even if a network other than a mobile communication network is used, and the communication can be maintained across networks.

Another communication system according to the present invention, in addition to the above-described components, an AAAL device is provided in each of a plurality of communication networks, the AAAL device sending charge information about its communication network over the Internet; and an AAAH device is provided in an information service network, the AAAH device managing accounting information about a mobile terminal based on the charge information sent from the AAAL device over the Internet. Thus,the communication system has the advantage that charges for the plurality of networks can be managed collectively.

What is claimed is:

1. A communication system which a mobile terminal can be connected to and comprises a plurality of communication networks using different communication technologies, each of said plurality of communication networks using the Internet Protocol to connect to the Internet, said communication system comprising:
    an information service network for managing accounting information about said mobile terminal and providing services; and
    an AAAL (Authentication, Authorization and Accounting Local) device provided in each of said plurality of communication networks for sending charge information about the network in which said AAAL device is provided over the Internet; a Mobile IP (Internet Protocol) HA (Home Agent) device provided in said information service network for managing which network said mobile terminal exists in and delivering received data to an appropriate network over the Internet; a FA (Foreign Agent) device provided in each of said plurality of communication networks for sending a position registration request from said mobile terminal to said HA device and transferring data delivered from said HA device over the Internet to said mobile terminal when said mobile terminal is under the coverage of said FA device; wherein said position registration request and a reply corresponding to said position registration request communicated between said HA device and said FA device are used to flexibly enable communications between said plurality of communication networks and the continuation of the communications across said plurality of communication networks; and wherein said mobile terminal detects available communication networks and automatically identifies a lower-charge available communication network based on said charge information to determine whether said position registration request for said mobile terminal should be allowed or not.

2. The communication system according to claim 1, wherein said plurality of communication networks include two or more of a mobile communication network, public telephone network, and private network.

3. The communication system according to claim 1, wherein said HA device performs the position registration of said mobile terminal in response to said position registration request sent from said FA device.

4. The communication system according to claim 1, further comprising an AAAH (Authentication, Authorization and Accounting Home) device provided in said information service network for managing accounting information about said mobile terminal according to said charge information sent from said AAAL device over the Internet.

5. The communication system according to claim 4, wherein said AAAL device determines whether said position registration should be allowed or not based on charge information added to the position registration request from said mobile terminal, said position registration request being input through said FA device.

6. The communication system according to claim 4, wherein the charge information communicated between said AAAL device and said AAAH device is used to provide a cash dispenser function.

7. A method for using a communication network in a communication system which a mobile terminal can be connected to, the communication system comprising a plurality of communication networks using different communication technologies, each of said plurality of communication networks using the Internet Protocol to connect to the Internet, said method comprising:

managing accounting information about said mobile terminal;

sending charge information about the network over the Internet via an AAAL (Authentication, Authorization and Accounting Local) device provided in each of said plurality of communication, networks;

managing which network said mobile terminal exists in via a Mobile IP (Internet Protocol) HA (Home Agent) device and delivering received data to an appropriate network over the Internet; sending a position registration request from said mobile terminal to said HA device via a FA (Foreign Agent) provided in each of said plurality of communication networks, and transferring data delivered from said HA device over the Internet to said mobile terminal when said mobile terminal is under the coverage of said FA device; wherein said position registration request and a reply corresponding to said position registration request communicated between said HA device and said FA device are used to flexibly enable communications between said plurality of communication networks and the continuation of the communications across said plurality of communication networks; and wherein said mobile terminal detects available communication networks and automatically identifies a lower-charge available communication network based on said charge information to determine whether a position registration request for said mobile terminal should be allowed or not.

8. The method for using a communication network according to claim 7, wherein said plurality of communication networks include two or more of a mobile communication network, public telephone network, and private network.

9. The method for using a communication network according to claim 7, wherein said HA device performs the position registration of said mobile terminal in response to said position registration request sent from said FA device.

10. The method for using a communication network according to claim 7, further comprising managing accounting information about said mobile terminal via an AAAH (Authentication, Authorization and Accounting Home) device provided in said information service network according to said charge information sent from said AAAL device over the Internet.

11. The method for using a communication network according to claim 10, wherein said AAAL device determines whether said position registration should be allowed or not based on charge information added to the position registration request from said mobile terminal, said position registration request being input through said FA device.

12. The method for using a communication network according to claim 10, wherein the charge information communicated between said AAAL device and said AAAH device is used to provide a cash dispenser function.

13. A communication system including a plurality of communication networks using different communication technologies, said communication system comprising:

an AAAL (Authentication, Authorization and Accounting Local) device provided in each of said plurality of communication networks for sending charge information about the network in which said AAAL device is provided over the Internet;

an AAAH (Authentication, Authorization and Accounting Home) device for managing accounting information about said mobile terminal according to said charge information sent from said AAAL device over the Internet;

a Mobile IP (Internet Protocol) HA (Home Agent) device provided in said information service network for managing which network said mobile terminal exists in and delivering received data to an appropriate network over the Internet; a FA (Foreign Agent) device provided in each of said plurality of communication networks for sending a position registration request from said mobile terminal to said HA device and transferring data delivered from said HA device over the Internet to said mobile terminal when said mobile terminal is under the coverage of said FA device; wherein said position registration request and a reply corresponding to said position registration request communicated between said HA device and said FA device are used to flexibly enable communications between said plurality of communication networks and the continuation of the communications across said plurality of communication networks; and wherein said mobile terminal detects available communication networks and determines whether said position registration request should be allowed or not based on charge information.

14. A method for negotiating communication between a mobile terminal and a plurality of communication networks using different communication technologies, said method comprising:

sending a position registration request from said mobile terminal to a Home Agent (HA) device via a Foreign Agent (FA);

sending charge information about a network via an AAAL (Authentication, Authorization and Accounting Local) device provided in each of said plurality of communication networks;

managing accounting information about said mobile terminal via an AAAH (Authentication, Authorization and Accounting Home) device according to said charge information sent from said AAAL device;

detecting available communication networks;

determining whether said position registration request should be allowed or not based on charge information; and wherein said position registration request and a reply corresponding to said position registration request communicated between said HA device and said FA device are used to flexibly enable communications between said plurality of communication networks and the continuation of the communications across said plurality of communication networks.

* * * * *

UNITED STATES PATENT AND TRADEMARK OFFICE
CERTIFICATE OF CORRECTION

PATENT NO. : 7,275,108 B2 Page 1 of 1
APPLICATION NO. : 09/987517
DATED : September 25, 2007
INVENTOR(S) : Masayuki Sakata It is certified that error appears in the above-identified patent and that said Letters Patent is hereby corrected as shown below:

Col. 2, line 45 delete "exist", insert --exists-- p. 4, line 21

Col. 4, line 25 delete "VoIP", insert --VOIP-- p. 8, line 13

Col. 6, line 4 delete "is", insert --are-- p. 12, line 6

Col. 7, line 10 delete "VoIP", insert --VOIP-- p. 14, line 19

Col. 12, line 11 (Claim 9) delete "7", insert --8--
    Examiner's Amendment: p. 4, claim 17, line 1

Col. 12, line 16 (Claim 10) delete "7", insert --8--
    Examiner's Amendment: p. 4, claim 18, line 1

Signed and Sealed this

Twenty-sixth Day of August, 2008

JON W. DUDAS
*Director of the United States Patent and Trademark Office*